United States Patent Office 2,737,504
Patented Mar. 6, 1956

2,737,504

REACTION PRODUCT OF DICYANDIAMIDE, FORMALDEHYDE AND ALKALI METAL SALT OF A SULFONIC ACID

William O. Dawson, Amherst, N. H., and Lucien Sellet, Saddle River, N. J., assignors to Jacques Wolf & Co., a corporation of New Jersey No Drawing. Application November 5, 1953, Serial No. 390,425

5 Claims. (Cl. 260—70)

This invention relates to a soluble resinous condensation product including dicyandiamide and formaldehyde that, in aqueous solution, is precipitable on the addition of aluminum sulfate or like acidic material.

This application is a continuation in part of our application Serial No. 141,939 (now abandoned) filed February 2, 1950, for Resin Composition and Method of Making.

Our Patent 2,567,238 discloses a method of making water soluble dicyandiamide and formaldehyde resins. Briefly, the invention there described includes the use of the formaldehyde in the proportion of 3.6 to 5 mols for 1 mol of the dicyandiamide and carrying the reaction, through the stage at which an insoluble resin forms, to the stage at which the resin becomes soluble again in water, the terms "insoluble" and "soluble" being used to mean insoluble or soluble, respectively, on infinite or large dilution with water. During manufacture, our products remain dissolved at all times.

We have now discovered a method which not only gives water soluble resin, either with or without the use of the large proportion of the formaldehyde recited in the said patent but also converts the soluble resin there described to such form that its solution is precipitable by acid. Such precipitation is desirable after application of the resin solution to a commercial article to be treated with the resin. Our new method also gives a product of somewhat retarded rate of premature gelling of its aqueous solutions, as compared to the rate of gelling of the product described in our said patent.

Briefly stated, the invention comprises interacting dicyandiamide, formaldehyde, and a water soluble sulfonic acid salt, the said salt being used in proportion to make the product non-precipitable on extreme dilution with water but precipitable by aluminum sulfate. The invention comprises also the resulting composition, the compositions being adapted for use by impregnation into a penetrable material and subsequently precipitated on acidification.

In one embodiment, dicyandiamide and formaldehyde are first reacted before the sulfonic acid salt is added. This initial reaction may be effected as described in our said patent except as stated herein to the contrary. It is not necessary, however, in the present invention to use a large proportion of formaldehyde to dicyandiamide. In fact, the proportion of formaldehyde used may be as low as 1 mol to 1 mol of dicyandiamide or as high as 5 to 1. There is no need of using a higher proportion of formaldehyde.

The stabilizing agent used is anionic, water soluble, and a salt of sulfonic acid. The salts selected for the stabilizing effect should be non-acidic, that is, either neutral or alkaline.

Sulfonates that meet these requirements and that we use to advantage in making our resin solution are the water soluble non-acidic salts of sulfonic acids. Examples are the alkali metal salts of sulfonic acids containing a bivalent bridge such as an alkylene (—$CH_2$—, —$C_2H_4$—, —$C_3H_6$—) or a sulfone (—$SO_2$—) bridge between two aromatic phenol residues, as in the following illustrative formulas:

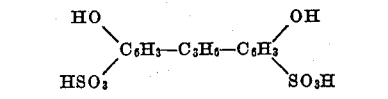

Di-hydroxyphenylpropane disulfonic acid

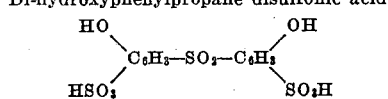

Di-hydroxyphenyl sulfone disulfonic acid

Specific examples are the sodium, potassium, and ammonium salts of the following: naphthalene sulfonic acid and formaldehyde condensation product, sulfonated phenolformaldehyde condensation products, the condensation product of sulfonated phenol and formaldehyde, sulfonated product of di-hydroxyphenyl sulfone (see above) or of di-hydroxyphenyl propane (see above) preferably in the form of the omega sulfonation, sulfonated di-hydroxyphenyl methane, and sulfonated phenolic derivatives possessing a urea-formaldehyde-condensation bridge or other resin intermediate in a bridge structure. Other anionic agents that, in the form of their neutral or alkaline salts, give products that are soluble in water, precipitable by acids, and useful for some purposes are sulfonated alcohols ($RO.SO_3H$) such as sulfonated cetyl, lauryl, or stearyl alcohol, these sulfonated alcohols being more correctly named sulfated alcohols and the term sulfonated alcohols including sulfonated castor, neat's-foot, teaseed, and like fatty oils; alkyl sulfonates ($R'.SO_3H$) in which $R'$ represents an alkyl group containing 12–20 carbon atoms; and sulfited lignin, this being a by-product of the manufacture of sulfite wood pulp. These said other agents are useful when firmness is not necessary in the product, as in material for fat liquoring leather.

In all cases we use the acid sulfo compounds in the form of the water soluble salt with sodium or like metal.

The proportion of the sulfonic acid salt required to make the finished resin of the properties desired varies with the period of heating before the salt is introduced. The proportion varies in a representative preparation from 90 parts by weight for 1 mol. of dicyandiamide for no heating after insolubility of the dicyandiamide and formaldehyde condensation product first appears (as illustrated approximately by the 92 parts of Example 1), up to 110 parts for the A stage resin, to 111–145 parts for what is considered the B stage (Example 4), and to 146–180 for the later or C stage, this data being obtained with the sodium salt of dinaphthyl methane disulfonic acid as the anionic agent and the various stages representing the complexity at the various stages of condensation of the dicy resin, at which stages the anionic agent is introduced. With the A and B-stage material, the amount of anionic agent used is that required to solubilize the condensation product which otherwise is insoluble in water, i. e. water precipitable. Proportions of the sulfonic acid salt are stated in terms of parts by weight for 100 parts dry weight of the formaldehyde and dicyandiamide condensation product.

For the procedure in determining the proportion of anionic agent to be used, reference is made to the procedure later herein.

The A-stage is that obtained immediately after the resin becomes insoluble in water. This is determined by adding 3 drops of the resin to a test tube of water at 30° C. In some cases the resin on immediate contact with the water will precipitate but redissolve on shaking. When a cloudy solution remains after shaking, the A phase has been reached.

The B-stage is that following the A. The B-stage product shows definite insolubility (milkiness in water). This insolubility continues up to the C-stage in which the product becomes water soluble.

The greater the extent of condensation prior to the addition of the anionic agent, such as the naphthalene sulfonic acid salt, or the longer the condensation (heating) is continued after the addition of the agent, the greater is the amount of the agent necessary to give water solubility of the composition with the formaldehyde and dicyandiamide.

The invention will be illustrated in greater detail by description in connection with the following specific examples.

*Example 1*

1 mol (84 g.) of dicyandiamide, 4 mols of formaldehyde, and 0.1 mol of borax as buffer to establish the pH above 7 are introduced into a flask and heated to 95° C. The resin that results initially is water soluble and will not precipitate (1) when acidified, (2) when the sodium salt of naphthalene sulfonic acid formaldehyde condensation product is added, or (3) when the mixture so made with the initial product is acidified. After 35 minutes at 95° C., however, the resin becomes water insoluble. It is then dissolved by the addition of 92 g. of dinaphthyl-methane disulfonic acid in the form of the sodium salt. The resulting product will precipitate immediately upon the addition of sulfuric acid or the like in amount to acidify the mixture.

*Example 2*

3 mols of formaldehyde 37% strength, 2 mols of dicyandiamide, 150 cc. of water, and 3.6 g. of borax are put in a container under a reflux condenser and warmed until dissolved. To this solution, in which the dicyandiamide and formaldehyde have not condensed, we add 538 g. of neutral 35% solution of the sodium salt of di-hydroxyphenyl propane sulfonate in the form of the omega sulfonation. The resulting solution is heated under reflux at 95° C. for 3 hours, to cause condensation. The product is a solution readily precipitable by addition of acid or acid salts as stated before.

*Example 3*

The procedure of Example 1 or 2 is followed except that the sodium salt of any other one of the sulfo compounds listed above is substituted, on an equal weight basis for the sulfonic acid salt of Example 1 or 2.

*Example 4*

The procedure of Example 1 is followed through the stage at which the resin becomes water insoluble. Then the heating is continued for 4 hours, until the formaldehyde and dicyandiamide condensation product becomes infinitely dilutable with water without precipitation. After this water soluble, C-stage resin is formed, dinaphthyl methane disulfonic acid in the form of the sodium salt is added. The first addition of this anionic agent causes precipitation with the C-stage resin. The addition is continued until the precipitate first formed redissolves and until the product formed becomes infinitely dilutable without precipitation. The total amount of the anionic agent added is 180 parts.

Because of the difficulty of redissolving the precipitate which forms on the first addition of the anionic agent, the order of mixing of the agent with the condensation product is reversed in commercial practice. In this practice, the formaldehyde and dicyandiamide condensation product, at the water soluble or C-stage, is introduced gradually with stirring into the full amount of the anionic agent previously dissolved in water to give a concentrated solution, such as one containing 40 parts of the anionic agent to 60 of water. The amount of the anionic agent used is that determined by previous test as required to give the water soluble product after mixing with the formaldehyde and dicyandiamide condensation product.

Products made as described may be dried in conventional manner, shipped as a powder, and redissolved to give an aqueous solution at the time of use.

*Example 5*

1 mol of dycandiamide, 4 mols of formaldehyde in the form of its 37% aqueous solution, and borax in the proportion of 2% of the weight of the dicyandiamide are heated to refluxing for 4 hours. At this stage the resulting condensation product was soluble in water on substantially infinite dilution. There was then added the sodium salt of sulfonated castor oil (75% fatty acid), in the proportion of 9.8 parts for 1 part of the dicyandiamide. The product is useful in fat liquoring leather. The resulting solution was not precipitable on dilution with water but was precipitable by aluminum sulfate and other acidic materials.

*Example 6*

Dicyandiamide, borax and formaldehyde solution in the proportions of Example 5 were heated for 30 minutes, to give the B-phase resin that is water precipitable. There is then added a 20% solution of the sodium salt of lauryl sulfate in the proportion of 6 parts for 1 part by weight of the dicyandiamide. There resulted a solution that is precipitable by acidic materials such as inorganic and organic acids but not precipitable on dilution with water.

The temperatures of heating, in all cases, is below the temperature of the thermal decomposition of the sulfonic acid salt in aqueous solution.

*Procedure for determining requirement of solubilizing agent and testing stage of polymerization*

We divide the various polymer stages of the resin into three phases referred to as A, B and C.

A is considered as being a very low polymer.
B is considered as being a medium size polymer.
C is considered as being a large size polymer.

The various polymer sizes are determined as follows:

A 20% solution of dinaphthyl methane disulfonic acid sodium salt is prepared by dissolving 50 g. of the salt in hot water and then diluting to 250 cc. 20 g. of the dicyandiamide and formaldehyde resin to be tested is weighed into a beaker. The sulfonate solution is added to the resin until the mixture is infinitely soluble in cold water. This is determined by the addition of 3 drops of the mixture to a test tube of water at 30° C. If a milky solution or even hazy solution results, then insufficient of the sulfonate has been added.

The amount of sulfonate to be added for complete water solubility of the resin and anionic agent composition is determined exactly as above. However the addition of the first few cc. of the solution of the salt may cause precipitation. Further additions of the sulfonate solution redissolve any precipitate that may have formed.

Products made as described are precipitable on the addition of aluminum sulfate and other like acidic salts. Examples of such other salts are the alums, ferric sulfate, titanium sulfate, and zirconium sulfate. Other acidic substances may be used including sulfuric acid, formic acid, acetic acid and hydrochloric acid. However, these free acids are not as positive and certain in their precipitating action as aluminum sulfate or like acidic salts.

A special result is obtained when boric acid is introduced under certain conditions. For that reason boric acid is not the acid to be used for the precipitation.

The acidic material selected for precipitation is used in proportion to establish the pH below 7 and preferably between 3.8 and 2. The precipitate is an effective impregnating material in porous sheet products.

It will be understood that it is intended to cover all changes and modifications of the examples of the invention herein chosen for the purpose of illustration which

What we claim is:

1. In making a resin that is soluble in water and precipitable by aluminum sulfate, the process which comprises heating an aqueous solution of dicyandiamide and formaldehyde, to form a condensate thereof, introducing into the solution a non-acidic water soluble, anionic alkali metal salt of a sulfonic acid in proportion to dissolve any precipitate that forms on adding the first portions of the salt, and maintaining the solution that results in heated condition at a pH above 7 until the resulting material becomes non-precipitable on dilution with water but preciptable by aluminum sulfate, the sulfonic acid represented in the said salt being selected from the group consisting of aromatic sulfonic acids, sulfonated alcohols, and sulfited lignin.

2. The process of claim 1 in which the dicyandiamide and formaldehyde solution are heated to the stage at which the resulting condensate is precipitable on extreme dilution with water and the said anionic salt is introduced into the condensate at this stage and in hot condition.

3. A resinous material characterized by water solubility, non-precipitability from solution on dilution with water and precipitability by aluminum sulfate, the said material being the product of interacting, in aqueous solution, dicyandiamide, formaldehyde, and a non-acidic water soluble alkali metal salt of a sulfonic acid selected from the group consisting of aromatic sulfonic acids, sulfonated alcohols, and sulfited lignin at a pH above 7.

4. The product of claim 3 in which the said sulfonic acid is the condensation product of naphthalene sulfonic acid and formaldehyde.

5. The product of claim 3 in which the said sulfonic acid is the condensation product of an aromatic sulfonic acid with formaldehyde.

References Cited in the file of this patent

UNITED STATES PATENTS

| | | |
|---|---|---|
| 2,088,227 | Battye et al. | July 27, 1937 |
| 2,567,238 | Sellet et al. | Sept. 11, 1951 |
| 2,637,622 | Dawson et al. | May 5, 1953 |

FOREIGN PATENTS

| | | |
|---|---|---|
| 822,349 | France | Sept. 13, 1937 |